J. O. HAMEL.
SELF PROPELLED VEHICLE.
APPLICATION FILED OCT. 15, 1918.
1,342,440.
Patented June 8, 1920.
2 SHEETS—SHEET 1.
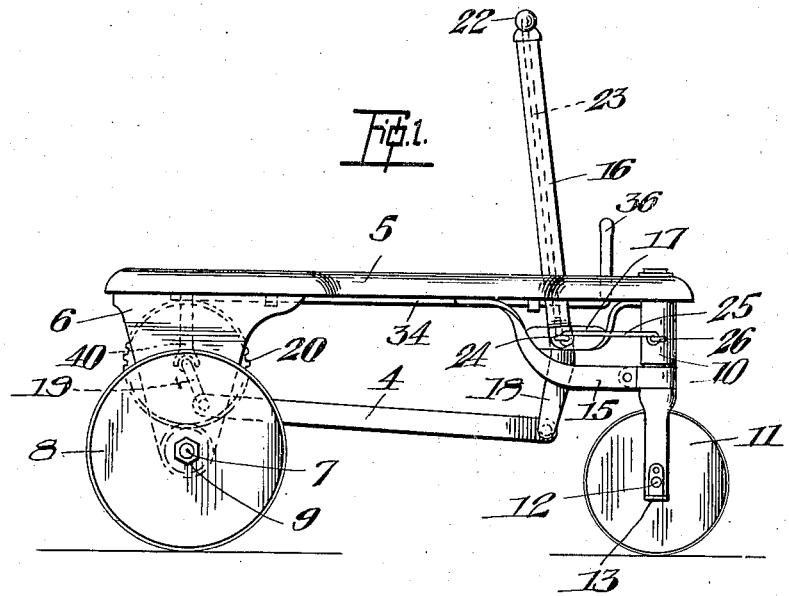
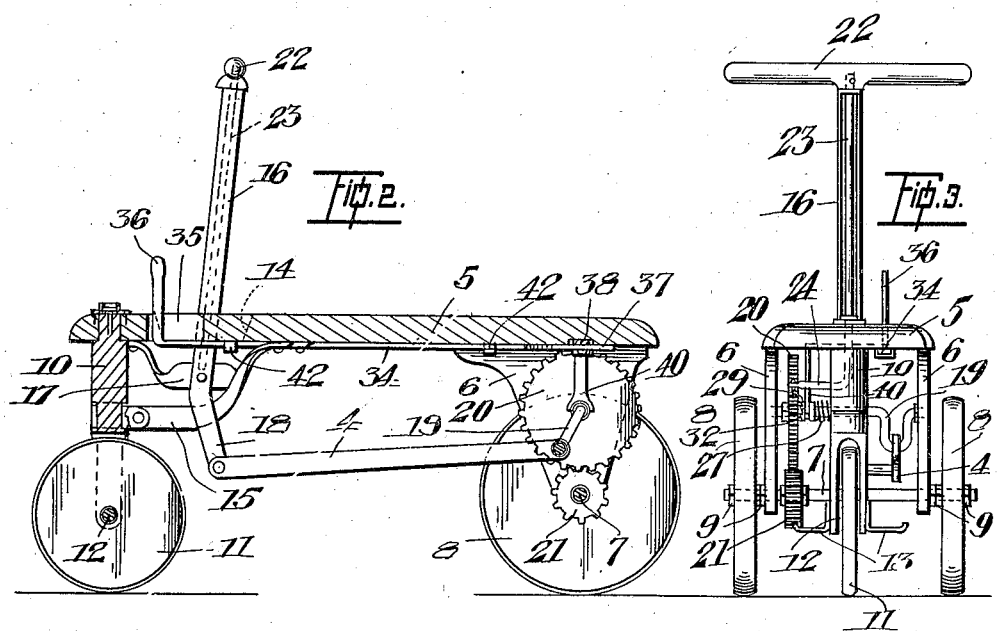
WITNESSES
INVENTOR
JOSEPH, O. HAMEL
BY
ATTYS.

J. O. HAMEL.
SELF PROPELLED VEHICLE.
APPLICATION FILED OCT. 15, 1918.
1,342,440.
Patented June 8, 1920.
2 SHEETS—SHEET 2.
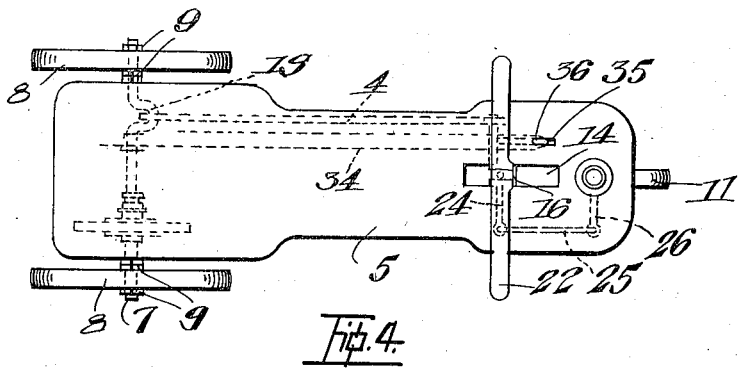
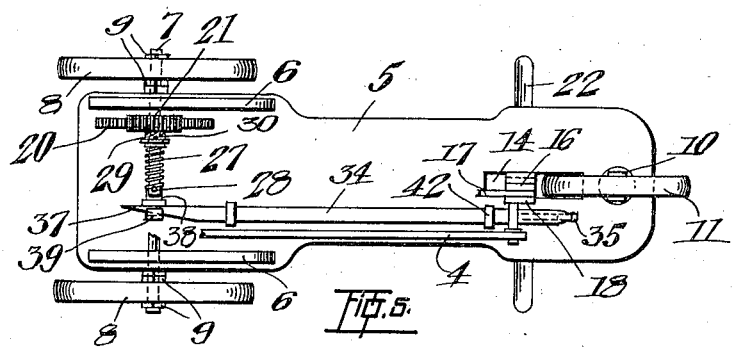
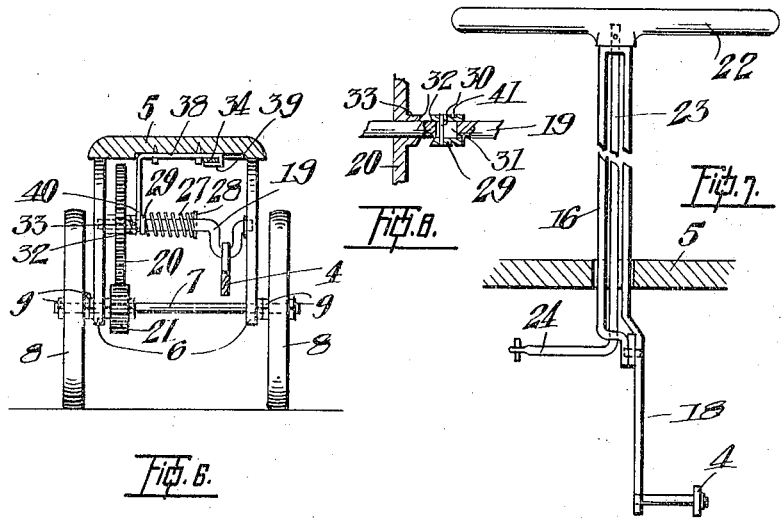
WITNESSES
INVENTOR
JOSEPH O. HAMEL
BY
ATTYS.

UNITED STATES PATENT OFFICE.

JOSEPH ODILON HAMEL, OF SMITH'S FALLS, ONTARIO, CANADA.

SELF-PROPELLED VEHICLE.

1,342,440.    Specification of Letters Patent.    Patented June 8, 1920.

Application filed October 15, 1918. Serial No. 258,244.

*To all whom it may concern:*

Be it known that I, JOSEPH ODILON HAMEL, a subject of the King of Great Britain, and resident of Smith's Falls, in the Province of Ontario, Dominion of Canada, have invented certain new and useful Improvements in Self-Propelled Vehicles, of which the following is a specification.

This invention relates to improvements in self-propelled vehicles, and the objects of the invention are to provide a simple and durable mechanism for self-propelled vehicles especially adapted for children, which will be easily accessible for repair and to facilitate in enabling the vehicle to better perform the functions required of it.

With the above and other objects in view, the invention consists essentially of the improved construction particularly described and set forth in the following specification and accompanying drawings forming part of the same.

In the drawings:—

Figure 1 is a side view of the improved self-propelled vehicle.

Fig. 2 is a longitudinal sectional view, showing the driving mechanism.

Fig. 3 is an end view of the self-propelled vehicle.

Fig. 4 is a plan view of the top portion of the self-propelled vehicle.

Fig. 5 is a plan view of the under side of the self-propelled vehicle.

Fig. 6 is a perspective view of the rear end of the self-propelled vehicle.

Fig. 7 is a sectional view through the steering rod.

Fig. 8 is a sectional view through the clutch member.

In the specification like characters of reference, refer to like parts in the drawings.

The invention consists of a seat or body portion 5, to which is attached, a pair of tapered brackets 6, a rotatable axle 7 passing through the lower portion of the brackets 6, and on the ends of which a pair of wheels 8, are suitably mounted and which are secured to the axle by a plurality of nuts 9 on either side thereof.

At the forward end of the body portion 5, a forked member 10 is pivotally secured and to which a wheel 11 is rotatably mounted by means of a rivet 12. The lower portion of the forked member 10 is also provided with a plurality of laterally arranged brackets 13, one on either side thereof, and are rigidly secured thereto.

The brackets 13 are adapted to be used as a foot rest and to facilitate in steering the vehicle. A brace 15 is provided to strengthen the front end of the vehicle, one end of which is secured to the bottom of the body portion 5, the other end being fastened to the forked member 10.

An oscillatory lever 16 is pivotally mounted on a bracket 17 which is secured to the under side of the front portion of the body 5. The lever 16 passes through a slotted portion 14 in the body 5 being provided with an offset portion 18 which is pivotally connected to one end of the driving rod 4, the other end of the rod 4, being mounted on a crank shaft 19 near one end thereof.

A spiral spring 27 is slidably mounted on the crank shaft 19 and is held in position at one end by a pin 28, the other end of the spring being secured to a clutch member 29 slidably mounted on the crank shaft 19 by means of a pin 30 adapted to slidably engage in a slot 31 on the crank shaft 19.

The clutch member 29 is provided with a series of serrations 32 adapted to engage with opposite serrations on the clutch member 33 which is rigidly secured to a drive gear 20, rotatably mounted near the end of the crank shaft 19, the extreme ends of the crank shaft 19 being substantially journaled in the bracket 6, a second gear 21 being located at one end of the axle 7 adapted to mesh with the gear 20.

A rod 34 is slidably arranged on the under side of the body portion 5, and held in position by guide members 42. One end of the rod is bent upward and passes through a slot 35 on the body portion 5 and forms a handle 36. The other end of the rod 34 is tapered from one side thereof to a point 37 adapted to slidably engage and operate a bracket 38 by means of a loop 39 at one end thereof.

The bracket 38 has an offset part which extends downward from the body portion 5, the end portion 40 of which being substantially U-shaped to engage in a groove 41 on the clutch member 29 thus forming a means whereby a clutch member 29 may be thrown into and out of engagement with the drive 20.

The lever 16 is provided with a handle 22, which is rigidly attached to a steering rod 23 located in the center of the lever 16 and which extends downwardly through and parallel to the sides of the said lever, to the bracket 17, where it is bent outwardly to form an arm 24, this arm being connected by a link 25 to an arm 26, laterally arranged on the forked member 10, thus forming a steering device.

It will be understood that the driving and steering mechanism above described may be applied to small delivery wagons and the like.

In operation the lever 16 is connected to the rod 4 which is manually oscillated thus turning the crank shaft which rotates the driving gear 20, the gear 20 meshing with the smaller gear 21 gives the vehicle motion. The vehicle may be steered by the turning of the handle 22 or, by turning the front wheel 11 by means of the brackets 13 arranged thereon. By the operation of the handle 36 the clutch member 29 may be thrown into or out of engagement with the gear 20.

As many changes could be made in the above construction and many apparently widely different embodiments of my invention, within the scope of the claim, constructed without departing from the spirit or scope thereof, it is intended that all matter contained in the accompanying drawings shall be interpreted as illustrative and not in a limiting sense.

What I claim as my invention is:—

A device of the class described comprising a seat portion, a pair of tapered, downwardly extending brackets on the seat portion, an axle rotatably mounted on the brackets, and provided with ground wheels, a gear on the axle, a fork member pivotally mounted on the front end of the seat portion, a brace on the seat portion connected to the fork member, a ground wheel pivotally mounted on the fork member, a pair of laterally extending foot rests on the fork member, a pivotally mounted lever, a crank shaft, link means operatively connecting the lever and the crank shaft, a gear on the crank shaft meshing with the first said gear, clutch mechanism controlling the operation of the second gear, a steering rod passing through the pivotally mounted lever, and link means connecting the steering rod with the fork member, as and for the purpose specified.

In witness whereof I have hereunto set my hand in the presence of two witnesses.

JOSEPH ODILON HAMEL.

Witnesses:
 JOHN McEWEN,
 P. A. THOM.